United States Patent
Keshavachar et al.

[11] Patent Number: 5,839,069
[45] Date of Patent: Nov. 17, 1998

[54] SYSTEM AND METHOD FOR DETERMINING A MOBILE STATION HOME NETWORK SEARCH RATE

[75] Inventors: Bhaktha R. Keshavachar, Vancouver; Gerald W. Maliszewski, Camas; Peter J. Sevcik, Vancouver, all of Wash.

[73] Assignees: Sharp Microelectronics Technology, Inc., Wash.; Sharp Kabushiki Kaisha, Osaka, Japan

[21] Appl. No.: 630,130

[22] Filed: Apr. 10, 1996

[51] Int. Cl.[6] .................. H04Q 7/20; H04Q 7/22; H04Q 7/36

[52] U.S. Cl. .................. 455/437; 455/435; 455/432; 455/434

[58] Field of Search .................. 455/435, 403, 455/406, 407, 408, 414, 422, 432, 433, 434, 436, 443, 444, 437, 439, 440, 441, 445

[56] References Cited

U.S. PATENT DOCUMENTS

| | | | |
|---|---|---|---|
| 5,255,307 | 10/1993 | Mizikovsky | 455/433 |
| 5,303,297 | 4/1994 | Hillis | 455/406 |
| 5,613,204 | 3/1997 | Haberman et al. | 455/432 |
| 5,734,980 | 3/1998 | Hooper et al. | 455/432 |

OTHER PUBLICATIONS

European Telecommunications Standard—Draft—pr ETS 300 507, Aug. 1995, Second Edition entitled, European Digital Cellular Telecommunications System (Phaes 2); Service Accessibility (GSM 02.11 version 4.7.0).

*Primary Examiner*—Wellington Chin
*Assistant Examiner*—Keith Ferguson
*Attorney, Agent, or Firm*—Gerald W. Maliszewski; Daviid C. Ripma

[57] ABSTRACT

A method is provided for a mobile station to calculate the time intervals at which it monitors cells in a cellular phone system to find the mobile station's home network in the phone system. The monitoring varies with the rate at which the mobile station reselects proximate cells to locate itself in a telephone network. The time between cell selections is used as an indication of the mobile station's mobility. The variable search intervals, determined by the time intervals at which the mobile station reselects cells, is limited to insure that the mobile station at least monitors for its home network at a minimum specified interval of time. An apparatus is also provided to initiate home network monitoring at time intervals related to rate at which cells in a cellular phone system are reselected by a mobile station.

18 Claims, 7 Drawing Sheets

SYSTEM AND METHOD FOR DETERMINING A MOBILE STATION HOME NETWORK SEARCH RATE

BACKGROUND AND SUMMARY OF THE INVENTION

The present invention relates generally to cellular telephones, and more particularly to a system and method for optimizing the rate at which a mobile station telephone conducts a search for its home network.

Cellular telephone systems divide a geographical region into adjoining sections called Public Land Mobile Networks (PLMNs). The boundaries of the sections are often determined by size, geographical features, population density, or national borders. The region of every PLMN is further subdivided into cells. Cells can be visualized as small geographical zones covering the region. These zones, or cells, are joined to completely blanket the PLMN. Each cell has an allocation of distinct frequencies for communications with the mobile station. The frequencies of adjoining cells are different to prevent radio interference between mobile station users in adjoining cells.

Mobile stations are usually handheld telephones used by pedestrians or by individuals traveling in automobiles. A mobile station can contact another mobile station, or a telephone that is part of a fixed telecommunication network with permanent user locations. The user of a mobile station contacts another user through communications with the cell. A mobile station is also free to roam. That is, the mobile station is allowed to operate as it travels through a variety of geographical regions. To insure adequate communications, therefore, the mobile station will change cells, communicating with proximate cells as it moves.

When the user of a mobile station has a dedicated channel to communicate with other phone users, decisions regarding the choice of cell to communicate through are made at the network level. However, when the mobile station does not have a dedicated channel, the mobile station has more authority deciding in which cell it considers itself to be located. The mobile station constantly monitors the power level of radio signals transmitted by neighboring cells. Based on the monitored power levels, and information received from the cell, the mobile station makes a decision in which cell it is located. By choosing a particular cell, the mobile station simultaneously selects the PLMN to which the cell belongs.

In addition to searching for proximate cells, the mobile station also makes searches for its Home Public Land Mobile Network (HPLMN). The HPLMN is the network with which the mobile user has a subscription relationship, the network with which the mobile user prefers to do business. In the automatic network selection mode the mobile station automatically attempts to select and register with the HPLMN. In the manual network selection mode the HPLMN is usually one of several selectable PLMNs. Examples of cellular phone systems requiring a HPLMN search are the Global System for Mobile Communications (GSM) System, Personal Communications Service at 1900 Mhz (PCS 1900), and the Digital Cellular System at 1800 Mhz (DCS 1800). More details of the GSM system can be found in the text, "The GSM System for Mobile Communications" by Michel Mouly and Marie-Bernadette Paulet, Mouly and Paulet, 1992.

GSM cellular phone systems are operated in accordance with a set of comprehensive specifications. GSM 02.11 of the European Telecommunications Standard for GSM cellular telephones specifies that the mobile station shall make attempts to return to its HPLMN when visiting another PLMN. A value of 30 minutes between home network searches is listed in the specification. The specification also includes a note warning that use of values of less than 30 minutes may result in excessive battery drain.

It is desirable that the mobile station user communicates through their HPLMN. The cost of making calls through the network is known when a mobile station is connected to other users through the HPLMN. When the mobile station uses other PLMNs charges may vary, and the user may be unaware of higher costs as the call is being made. The HPLMN may also offer special services to its subscribers that are unavailable on other PLMNs. Such services include call forwarding and call barring. It is possible the mobile station, as it travels, will acquire another PLMN, other than the HPLMN, and remain with this network long after the mobile station has moved back within range of the HPLMN. As a result, mobile stations may visit PLMNs that are not the HPLMN more often than is necessary.

However, it is not desirable for a mobile station to be constantly searching for its HPLMN. Each search routine by the mobile station requires the use of battery power. Frequent searches rapidly reduce battery power and reduce the length of time that the mobile station can be operated before its battery is depleted.

It would be advantageous if a mobile station would search for its HPLMN more often than 30-minutes when there was a realistic chance of finding the HPLMN. It would be advantageous if the mobile station could increase the HPLMN search rate without unnecessarily wasting battery power with too many searches.

It would be advantageous if the mobile station would base the HPLMN search rate on the movement of the mobile station. Further, it would be advantageous if the mobile station based the search rate on, either the movement of the mobile station, or the minimum specification of 30 minutes when the mobile station was not moving.

It would be advantageous if the mobile station used the measurement of the intervals of time between cell selections as the basis of mobile station movement. Likewise, it would be advantageous if the mobile station had the option of using multiple samples of the time intervals between cell selections to generate an average time interval as the basis for the search rate.

It would be advantageous if the mobile station organized the measured intervals of time between cell reselections so that the most recent cell selection intervals had the highest priority in generating an average time interval as the basis of the HPLMN selection rate.

Accordingly, in a wireless communication system servicing a geographical area and including a plurality of communicating networks within the geographical area, each network including a plurality of intercommunicating cells, the communication system also including a plurality of mobile stations to send and receive user information, each mobile station identifying cells in a network to select one proximate cell for communications, with cells from a predetermined home network being preferably selected, a method is provided for determining the rate at which a mobile station searches for a home network comprising the steps of determining the rate at which cells are selected by the mobile station, and searching for a home network at a home network search rate that is proportional to the cell selection rate.

It is a feature of the present invention to provide a step for calculating the average time interval between cell selections and the step of determining if the average time intervals are less than a predetermined first value in order to generate a home network search rate as follows:

1. When the average time is less than the first value, selecting a search rate proportional to the average time interval calculated and,
2. When the average time is greater than the first value, selecting a search rate proportional to the first value.

In a preferred form of the invention, the step of dividing the average time interval by a predetermined second value, to scale the average time interval, is included. In another preferred method of the invention a step is included to calculate the average time interval by prioritizing measured time intervals stored with respect to an organization based on the elapse of time since the measurement was made to create a weighted average time interval.

In a wireless communication system servicing a geographical area and including a plurality of communicating networks within the geographical area, each network including a plurality of intercommunicating cells, the communication system also including a plurality of mobile stations to send and receive user information, each mobile station identifying cells in a network to select one proximate cell for communications, with cells from a predetermined home network being preferably selected, a system for determining the rate at which a mobile station searches for a home network has also been provided, comprising a HPLMN search rate generator to sense the rate at which the mobile station selects cells, and to generate a home network search rate proportional to the cell selection rate.

In one preferred form of the invention, the system further comprises a storage register for storing the measurement of time intervals between cell selections, and a comparator circuit to compare time interval measurements with a predetermined first value. In another preferred form of the invention, the system further includes a summing circuit for summing time interval measurements, a first divider circuit for dividing the time interval sum by an averaging value to provide an average time interval, and a comparator circuit to accept the average time interval for comparison to the first value.

It is a feature of the present invention that the system further comprises a second divider circuit for dividing the average time interval by a second value to provide a scaled average time interval for comparison to the first value.

The present invention is of particular value because it is able to strike a balance between two conflicting goals of the mobile station. The conflicting goals are conserving power, and establishing communications through the HPLMN. By monitoring the intervals between cell selections made by the mobile station, an indication of the mobile stations speed or movement is provided. By using the cell selection interval as a guide, the mobile station is able to determine when new cells may become detectable, and therefore when new networks are also likely to be detected. Increasing the search rate as the mobile station is in motion is a prudent method of increasing the likelihood of the finding the HPLMN without unnecessarily draining the battery power on wasted searches.

DETAILED DESCRIPTION OF THE PREFERRED EMBODIMENT

Figure 1:
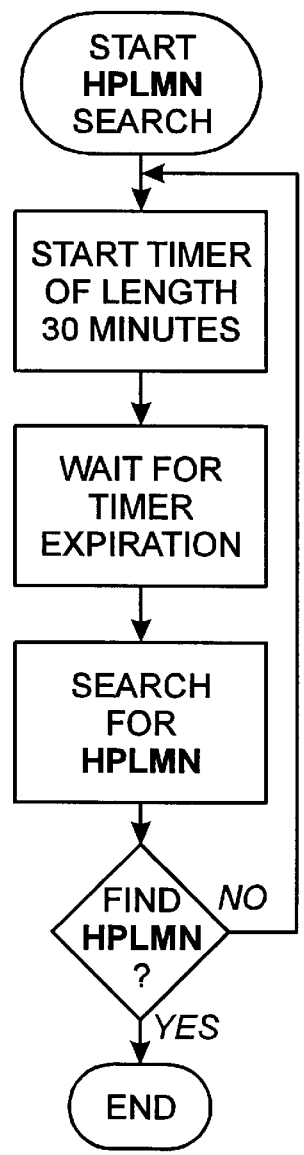
FIG. 1 is a flow chart diagram of the prior art method for a mobile station initiating a HPLMN search.

FIG. 1 is a flow chart diagram of the prior art method for a mobile station initiating a HPLMN search. After starting a HPLMN search, the methods proceeds to the step of setting a timer to the length of 30 minutes. The next step is to wait for the expiration of the timer. The next step is to search for the HPLMN. The next step is to determine whether the HLPMN has been found. If the HPLMN has been found, the search is over, if not, the process returns to the step of setting the timer to the length of 30 minutes.

Figure 2:
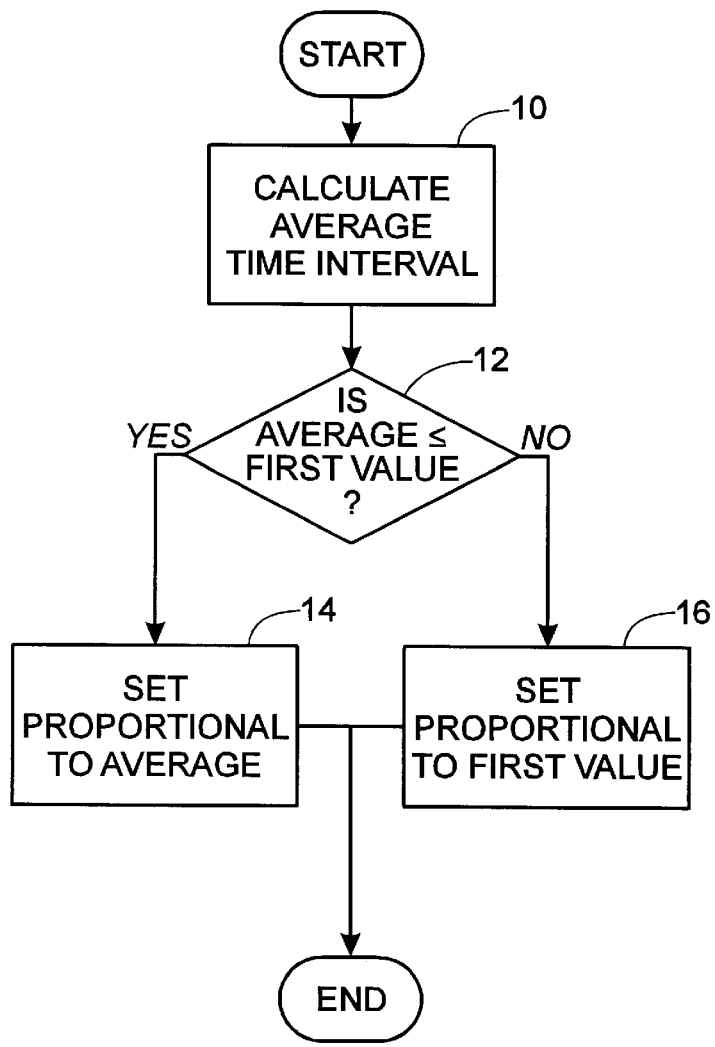
FIG. 2 is a flow chart diagram of the method of the present invention for determining the rate at which a mobile station searches for a home network.

FIG. 2 is a flow chart diagram of the method of the present invention for determining the rate at which a mobile station searches for a home network. After starting the search, the method proceeds to step 10, calculating the average time interval between cell selections. Step 12 determines if the average time interval calculated in step 10 is less than a predetermined first value in order to generate a home network search by the process that follows. When the average time interval is less than the first value, the method proceeds to step 14, selecting a search rate proportional to the average time interval calculated in step 10. When the average time interval is greater than the first value, the method proceeds to step 16, selecting a search rate proportional to the first value. In an alternate, simpler, embodiment of the present invention steps 12 and 16 are deleted. Therefore, the average time interval is calculated in step 10, and the search rate is set at a rate proportional to the average time interval in step 14. That is, the method for determining the rate at which a mobile station searches for a home network comprises the steps of determining the rate at which cells are selected by the mobile station, and searching for a home network at a home network search rate that is proportional to the cell selection rate.

Figure 3:
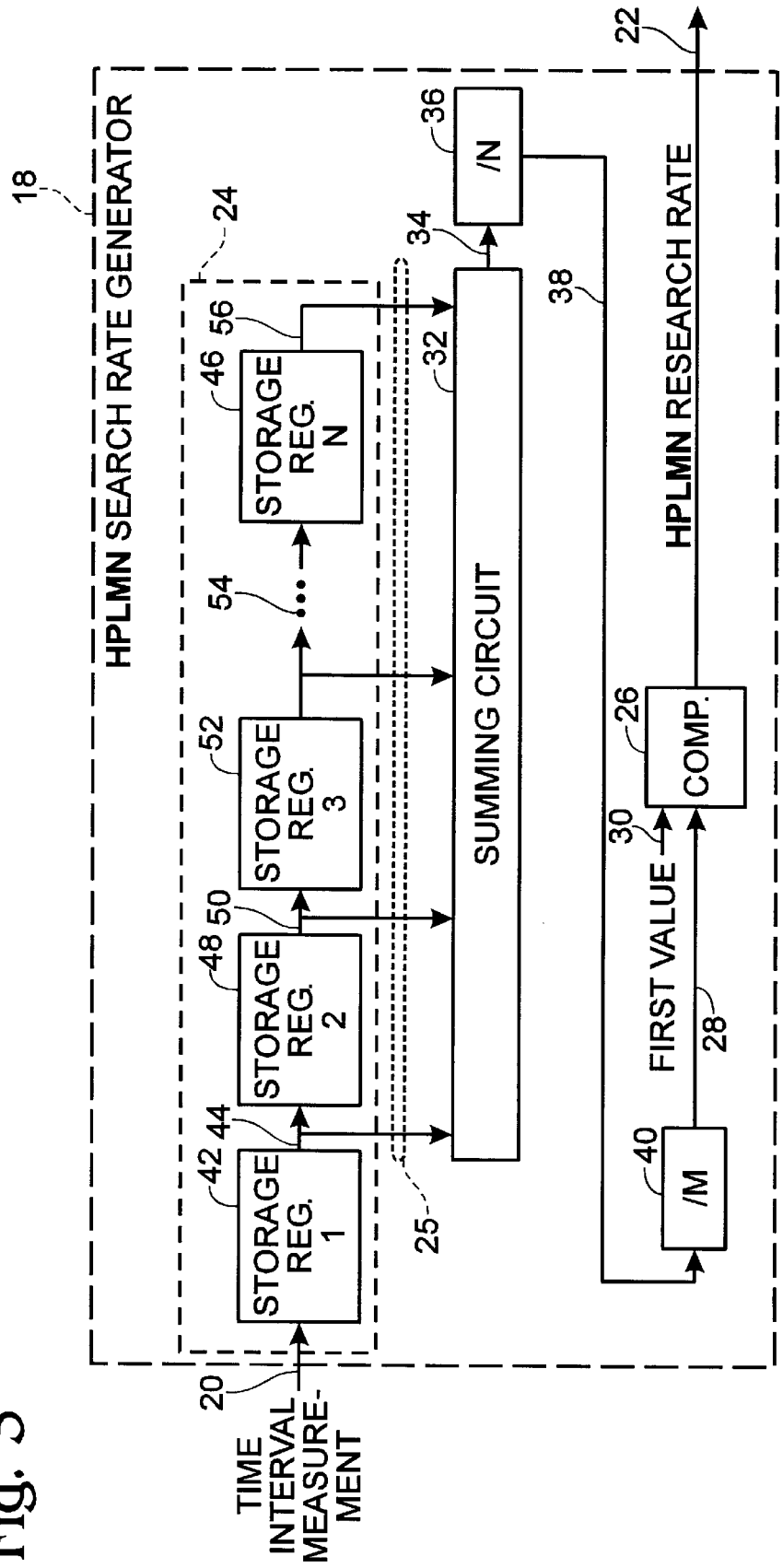
FIG. 3 is a schematic drawing illustrating the system of the present invention for determining the rate at which a mobile station searches for a home network.

FIG. 3 is a schematic drawing illustrating the system of the present invention for determining the rate at which a mobile station searches for a home network. A HPLMN search rate generator 18 accepts time interval measurements on a line 20 to sense the rate at which a mobile station selects cells, and to generate a home network search rate on a line 22 proportional to the cell selection rate. In a more detailed embodiment of the present invention, the system for determining the rate at which a mobile station searches for a home network comprises a storage register 24 for storing the measurement of time intervals between cell selections by the mobile station, register 24 having in input to accept the most recent time interval measurement on line 20, and an output on a line 25 to provide stored time interval measurements.

The system of FIG. 3 also comprises a comparator circuit 26 to compare a time interval measurement with a predetermined first value, comparator 26 having a first input on a line 28 operatively connected to the output of storage register 24 to accept the time interval measurement, a second input to accept the predetermined first value on line 30, and an output on line 22 to provide the home search rate as follows:

1. when the time interval is less than the first value, comparator 26 provides a search rate proportional to the time interval, and
2. when the time interval is greater than the first value, comparator 26 provides a search rate proportional to the first value.

The system depicted in FIG. 3 further comprises a summing circuit 32 for summing time interval measurements, summing circuit 32 having an input on line 25 operatively connected to the output of storage register 24 to accept time interval measurements, and an output on a line 34 to provide a time interval sum. The system also comprises a first divider circuit 36 for dividing the time interval sum by an averaging value, i.e., the value of n, first divider circuit 36 having an input on line 34 operatively connected to the output of summing circuit 32 to accept the time interval sum, and an output on a line 38 to provide an average time interval. The system further comprises comparator circuit 26 first input operatively connected to the output of first divider circuit 36 to accept the average time interval on line 38, to line 28, for comparison to the first value.

In one preferred embodiment of the invention of FIG. 3 wherein the averaging value, of first divider 36, is equal to n, n measured time intervals are summed by summing circuit 32, and first divider circuit 36 divides the time interval sum by n to provide the average time interval.

The system of FIG. 3 further comprises a second divider circuit 40 for dividing the average time interval by a predetermined second value, i.e., the value m, second divider 40 having an input on line 38 operatively connected to the output of first divider 36 to accept the average time interval, and an output on line 28 operatively connected to comparator circuit first input on line 28 to provide a scaled average time interval to comparator circuit 26 for comparison to the first value, whereby the average time interval is modified before it is compared with the first predetermined value.

In another preferred embodiment of the invention of FIG. 3, storage register 24 is a system of n sequential storage registers, and the stored time interval measurements on line 25 are taps to read the outputs of every individual register in the system. A first storage register 42 has an input on line 20 to accept the most recent time interval measurement between cell selections, first storage register 42 has an output on a line 44 operatively connected to the input of an nth storage register 46 to shift a stored time interval measurement, the output of said first storage register on line 44 also operatively connected to the input of summing circuit 32, the n storage registers sequentially connected to store the n most recent time interval measurements and providing the n most recent time interval measurements to the input of summing circuit 32.

Storage register 24 can alternately be described as a First In-First Out (FIFO) storage system with taps. First storage register 42 has an output on a line 44 operatively connected to the input of a second storage register 48. First storage register 42 is operatively connected through second storage register 48, having an output on a line 50, to a third storage register 52, which in turn has an output on a line 54. First storage register is ultimately connected to nth storage register 46 which has an output on a line 56. Therefore, the n most recent time interval measurements are provided to the input of summing circuit 32 on lines 44, 50, 54, and 56. Any number of registers, and register outputs, may be placed between third storage register 52 and nth storage register 46.

Figure 4:
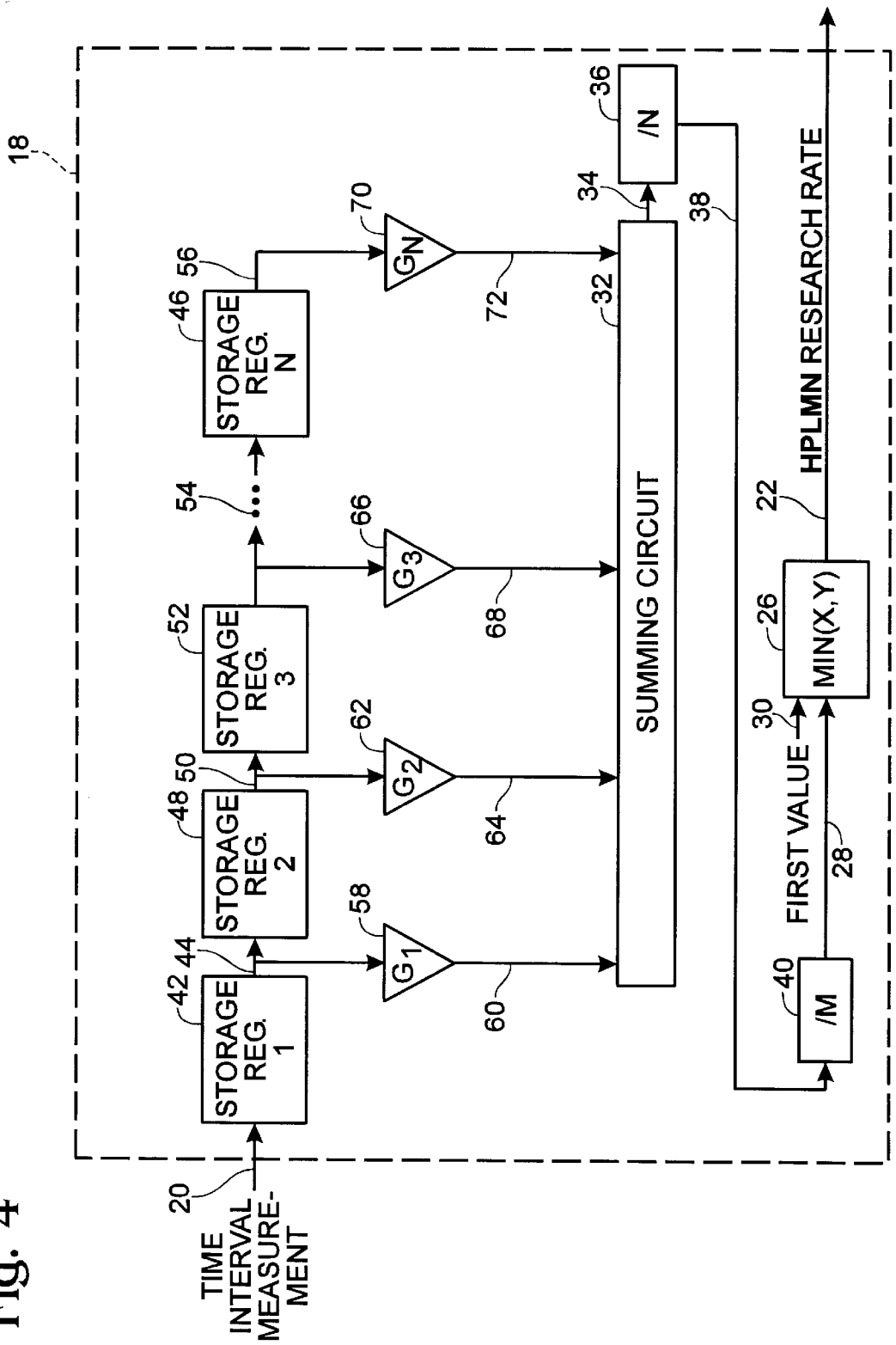
FIG. 4 is a detailed schematic diagram illustrating the system of the present invention of FIG. 3, with the addition of amplifiers for providing a weighted average.

FIG. 4 is a detailed schematic diagram illustrating the system of the present invention of FIG. 3, with the addition of amplifiers for providing a weighted average. The most recent time interval measurement between cell selections, sensed by HPLMN search rate generator 18, is assigned the highest priority in generating the home network search rate. The system comprises n amplifiers with n predetermined gains. A first amplifier 58 having an input on line 44, is operatively connected to the output of first storage register 42, and an output on line 60 is operatively connected to the input of summing circuit 32 to amplify the time interval measurement.

Likewise, a second amplifier 62 has an input on line 50 from output of second storage register 48, and an output on an line 64 to summing circuit 32. A third amplifier 66 has an input on line 54 from third storage register 52, and an output on a line 68 to summing circuit 32. A nth amplifier 70 has an input on line 56 from nth storage register 46, and an output on a line 72 to summing circuit 32. The number of amplifiers match the number of storage registers. Each one of n amplifier inputs, on lines 44, 50, 54, and 56, operatively connected between one of n storage register outputs and summing circuit 32 input to create n storage register-amplifier pairs, whereby the most recent time interval measurements can be emphasized to create a weighted average time interval.

One preferred embodiment of the system of FIG. 4 has a start-up condition when power is applied to the mobile station, and wherein the mobile station has permanent memory devices, not shown, containing at least n initial values accessible to the mobile station during start-up, and in which an initial value is stored in each of n storage registers 42, 48, 52, and 46 upon start-up of the mobile unit. One initial value being removed from nth storage register 46 every time a time interval measurement is received by first storage register 42, with initial values being replaced by measured time values until no initial values remain stored in storage registers 42, 48, 52, and 46, whereby initial values are used in the calculation of the average time interval until actual time intervals are measured.

Alternately, summing circuit 32 of FIG. 4 may be a series of (n−1) sequential summing circuits, not shown, so that the outputs of first register 42 and second storage register 48 are added in a first summing circuit and the output of the first summing circuit is added to the output of third storage register 52. In that manner, the outputs of all previous storage registers are added to the output of nth storage register 46, the final output being the time interval sum on line 34.

Figure 5:
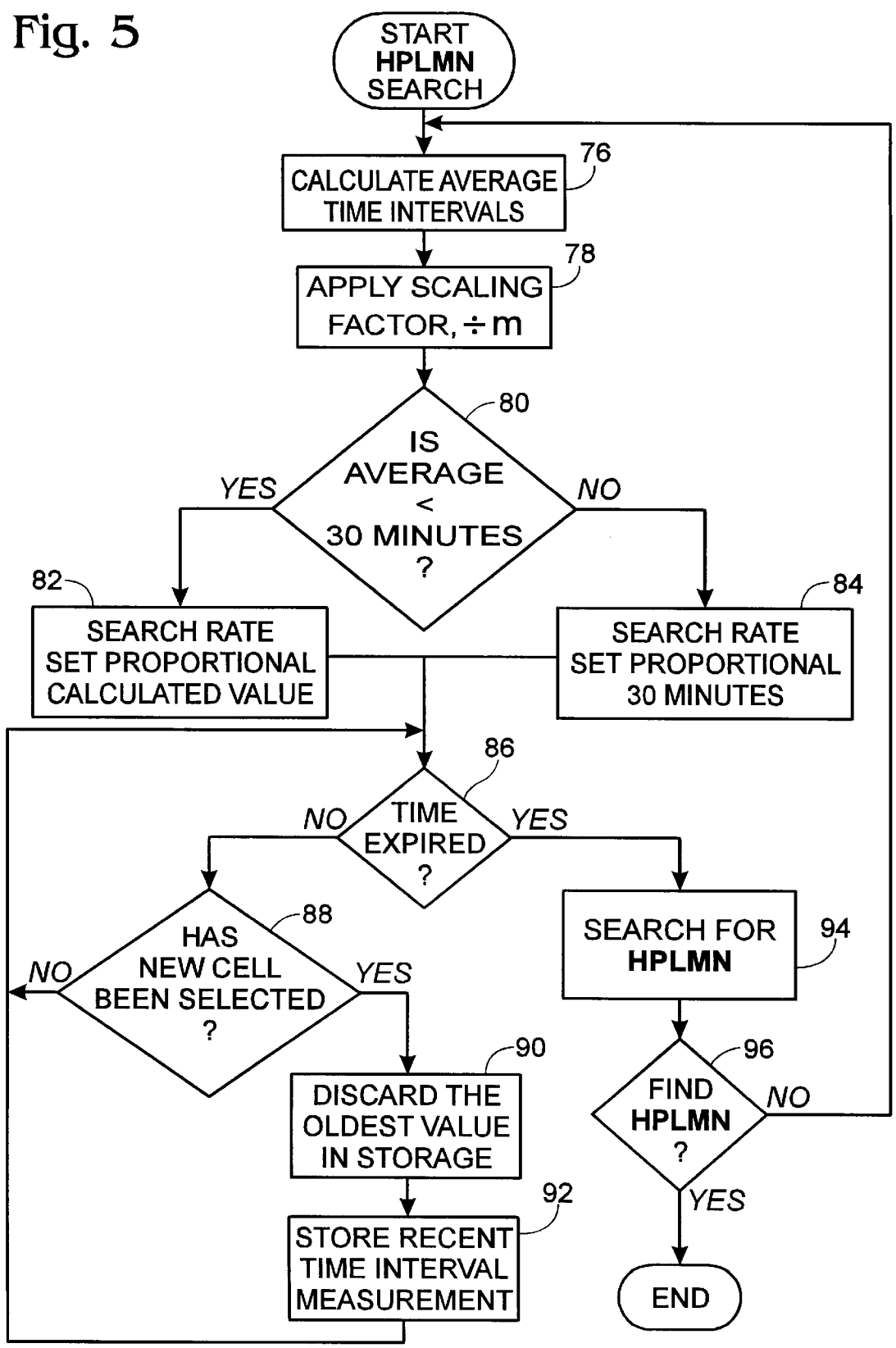
FIG. 5 is a detailed flow chart diagram of the method of the present invention of FIG. 2.

FIG. 5 is a detailed flow chart diagram of the method of the present invention of FIG. 2. Step 76 is the calculation on the average time interval. In one embodiment of the present invention, the method for determining the rate at which a mobile station searches for a HPLMN comprises the steps of summing n measured time intervals to provide a time interval sum, and dividing the time interval sum by n to provide the average time interval in step 76. Step 78 applies a scaling factor to the average time interval, dividing the average time interval calculated in step 76 by a predetermined second value to scale the average time interval before the determination is made of the home network search rate. Scaling may be useful as another method of weighing the average time interval. Large values of m, for example, will initiate searches at a faster rate than smaller values of m.

Step 80 determines if the average time value is less than the first value. The first value is typically 30 minutes to match GSM 2.11 of the GSM specification, however, other values may also be appropriate, especially with the use of a large value of m in step 78. When the average time interval is less than the first value, the process continues to step 82 where a search rate proportional to the average time interval calculated in step 76 is selected. If, in step 80, the average time interval is greater than the first value, then the process continues to a step 84 where a search rate proportional to the first value is selected.

In step 86 a determination is made of whether the time, set by the home network search rate, has expired. If, in step 86, time has expired, the process continues to step 88 which determines if a new cell has been selected, that is, if a more recent time interval measurement has been made. If, in step 88, the answer is yes, the process continues to step 90 which discards the oldest time interval measurement in storage. The process further continues to step 92 which stores the most recent time interval measurement.

In one preferred embodiment of the present invention up to n time interval measurements are kept in storage and the process includes the further step of organizing the time intervals with respect to the elapse of time since each measurement was made. That is, the preferred embodiment includes the steps of storing the n most recently measured time intervals according to the organization of time interval measurements stored with respect to the elapse of time since each measurement was made, and calculating the average time interval in step 76 with the n measured time intervals stored in step 92.

If, in step 88, no new cells have been selected then the process returns to step 86 to determine if time has expired. If, in step 86, is has been determined that time has expired, the process continues to a step 94 which initiates the step of searching for the HPLMN. In step 96 it is determined whether the HPLMN has been found. If, in step 96, the HPLMN has not been found, the process returns to step 76 to calculate an average time interval. If, in step 96, the HPLMN has been found, the process comes to an end.

Figure 6A:
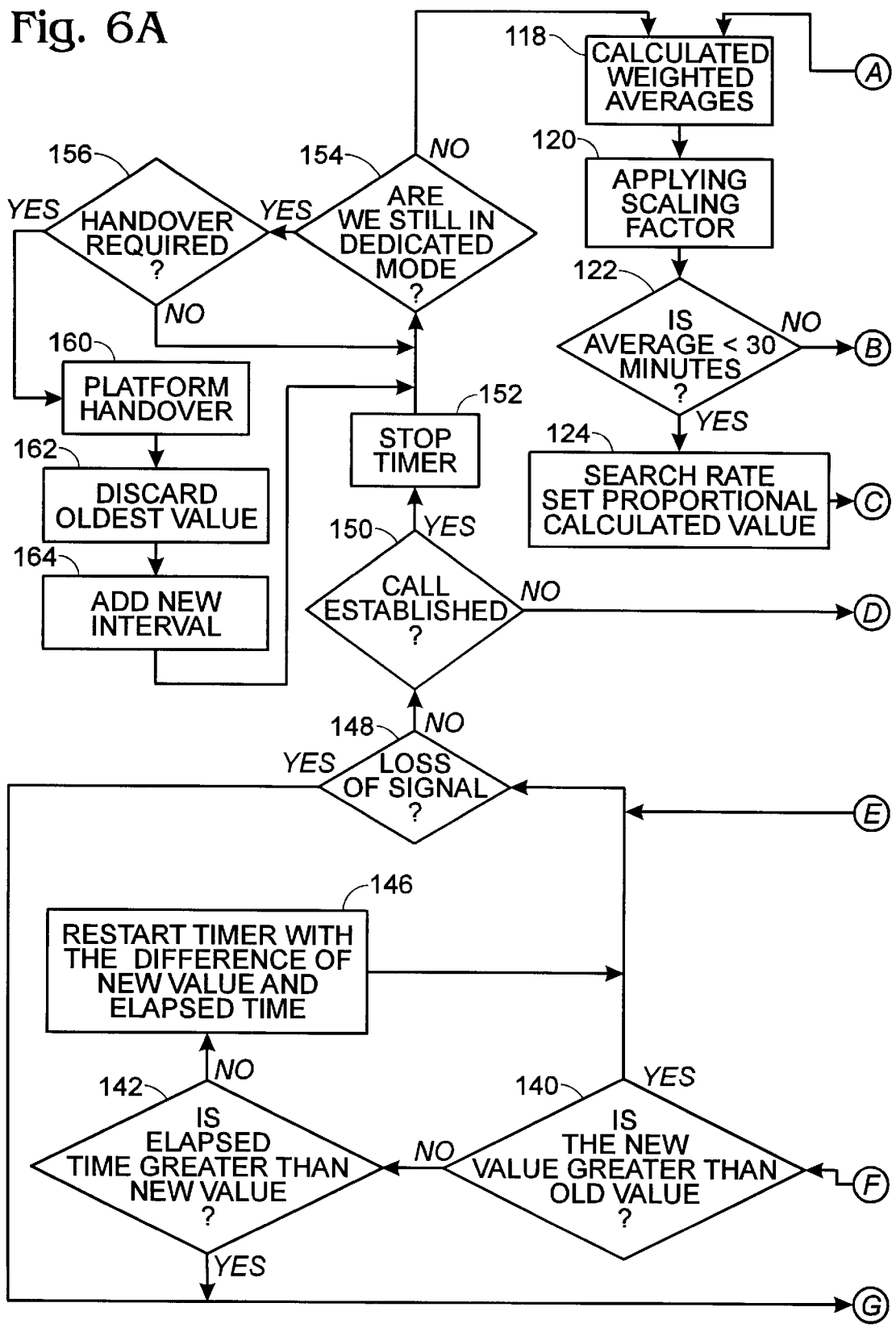
FIG. 6 is a more detailed flow diagram of the method of the present invention of FIG. 2.
Figure 6B:
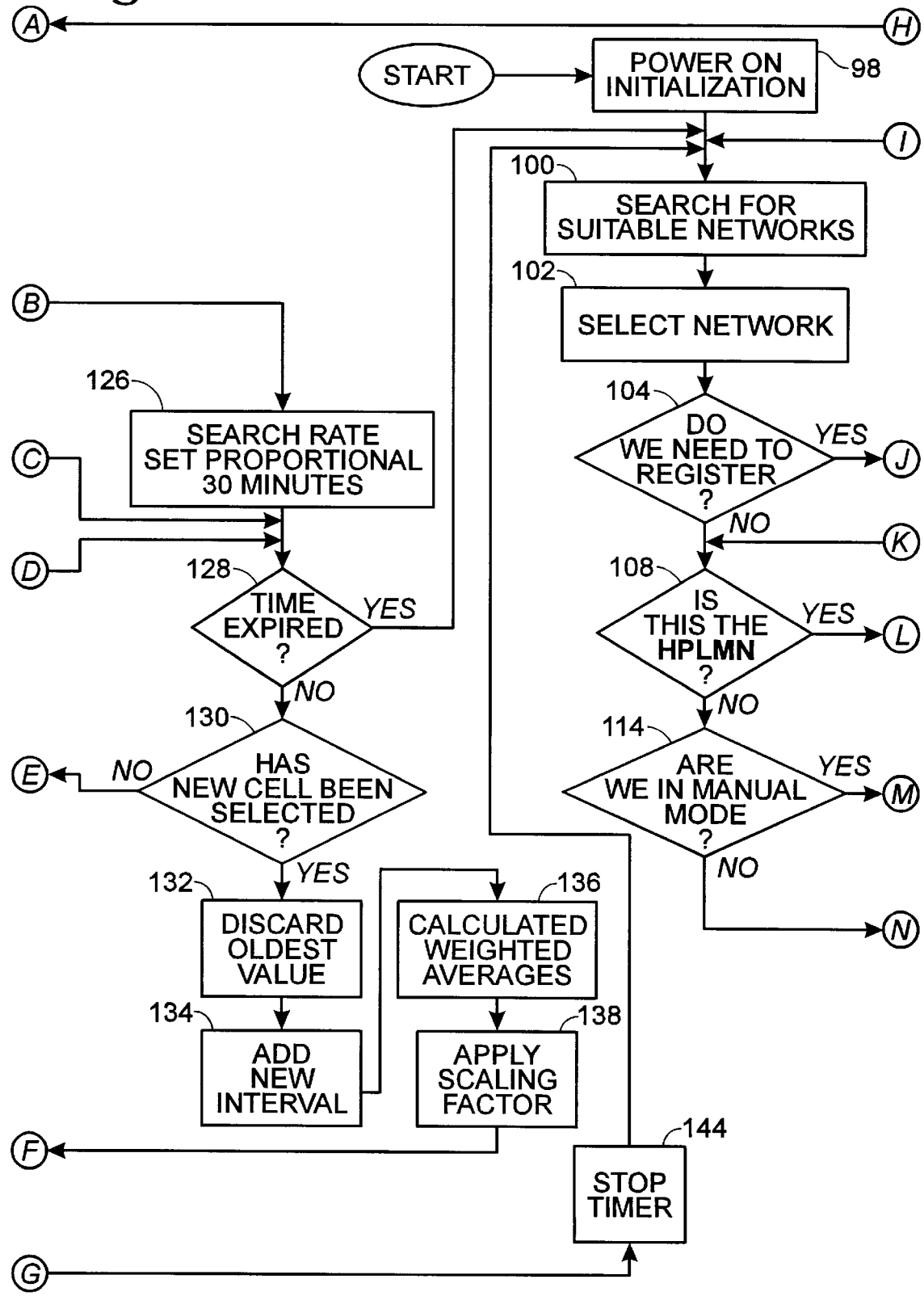
Figure 6C:
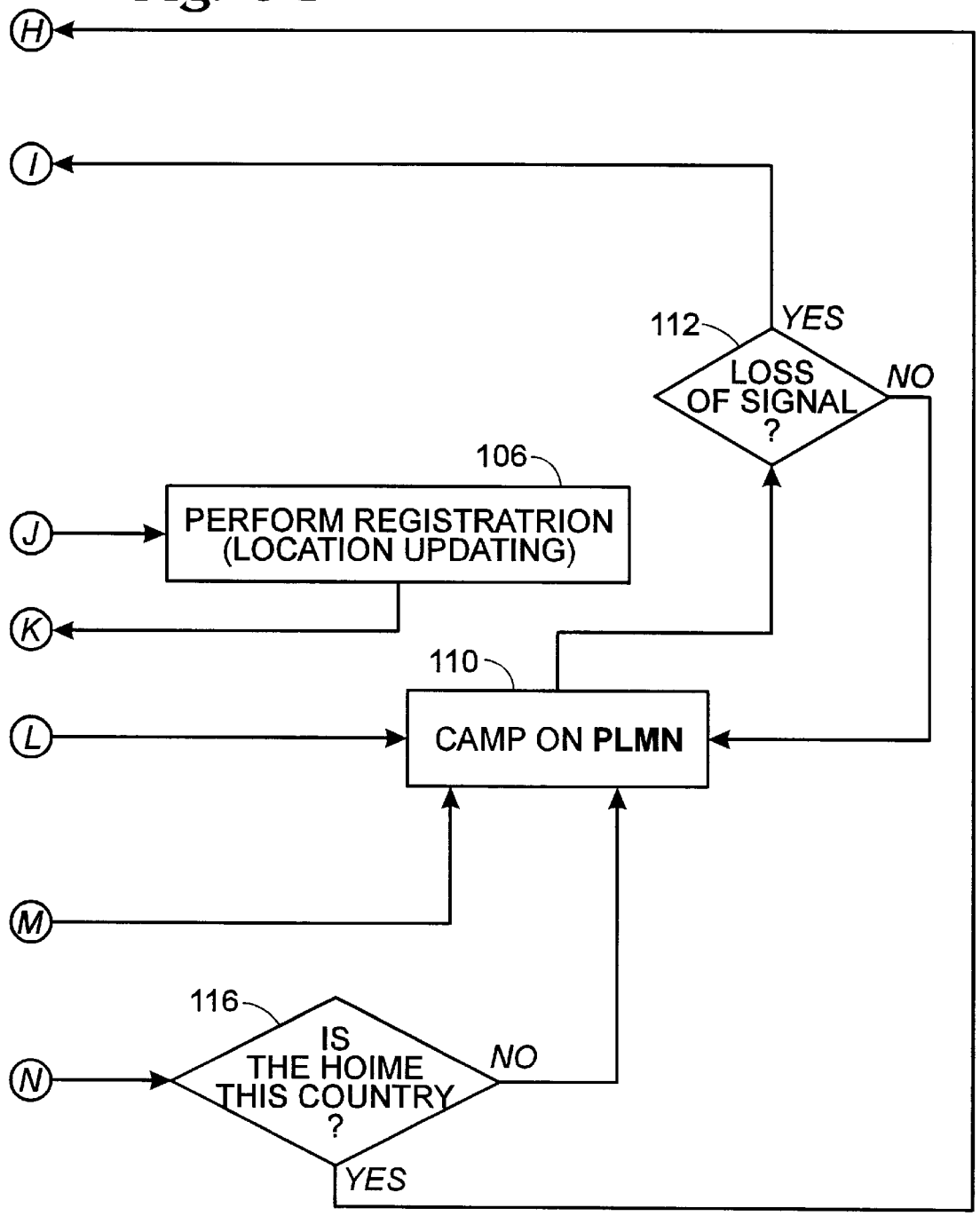

FIG. 6 is a more detailed flow diagram of the method of the present invention of FIG. 2. After the process start is step 98, the power On, or start-up, of the mobile station, wherein the mobile station has a start-up condition when power is first applied to the mobile station, and wherein the mobile station has a permanent memory, not shown, containing at least n initial values accessible to the mobile station during start-up and further comprise the step of storing n initial values upon start-up to provide initial cell selection time intervals.

The process continues to step 100 which institutes a search for suitable networks. This search entails the mobile station attempting to locate proximate cells by monitoring radio frequencies with strong power levels. Once all suitable proximate cells have been found, the process continues to step 102 to select a network. That is, the mobile station selects the network associated with a proximate cell it has detected in step 100.

In step 104 it is determined whether the mobile station needs to register with the network. The PLMNs of the GSM system provide a mobile station location registration function. In order for the phone system to locate mobile stations not already using a dedicated channel, a mobile station must identify which cell it has selected. This situation often occurs when the mobile station has been turned off for a period of time so that the system has no record of the mobile station's present location. The location information is important since the network may be required to direct a communication to the user of the mobile station from another phone user. If registration is necessary, the process continues to step 106 where the location updating function is performed.

In step 108 the mobile station determines whether the network selected is the HPLMN. If, in step 108, the HPLMN has been located, the process continues to a step 110 in which the mobile station locks on to, or "camps", on the PLMN it has selected. The mobile station continues to be camped on the PLMN until a loss of signal occurs in step 112. A loss of signal occurs when the mobile station is unable to adequately communicate through any of the cells in the selected PLMN. When a loss of signal occurs the process returns to step 100 to search for a suitable network.

If, in step 108, the network selected is not the HPLMN, the process continues to a step 114 where it is determined whether the mobile station is in manual mode. In manual mode the mobile station user has the option of manually selecting a network. Therefore, if manual mode has been selected, the process may continue to step 110 where the mobile station camps on the PLMN. If, in step 114, it is determined that the mobile station is not in manual mode, the process continues to step 116 where it is determined if the home network is in the same country as the network that has been found. If not, the mobile station assumes that the home network is too far away to find and continues to step 110 to camp out on the found PLMN.

If, in step 116, the found PLMN is in the same country as the HPLMN the process continues from connection B on sheet 1 of FIG. 6 to connection A on sheet 2 of FIG. 6, and further to step 118 where a weighted average is calculated. In a preferred embodiment of the present invention the home network search rate is determined with the step of assigning the most recent time interval measurement between cell selections with the highest priority in generating the home network search rate. Since more recent time interval measurements have a higher priority in the calculation of the average time interval, the average is weighted.

Another preferred embodiment of the present invention includes the steps calculating the average time interval by prioritizing the measured time intervals with the organization of time interval measurements stored with respect to the elapse of time since the measurement was made, to create a weighted average time interval with the most recently measured time interval having the greatest priority in the determination of the average.

Weighted averages can be calculated by multiplying each time interval measurement by a mathematical function that varies linearly with respect to how recent the time interval measurement is. Non-linear weighted averages can be calculated by multiplying the time interval measurements in storage by a non-linear, or exponentially varying mathematical function.

In step 120 the scaling factor is applied to the average time interval which comprises the step of dividing the average interval calculated in step 118 by predetermined second value to scale the average time interval. In step 122 it is determined if the scaled average time interval is less than a predetermined first value. The first value typically being 30 minutes. If the average time interval is less than 30 minutes, the process continues to step 124 where the home network search rate is set to a value proportional to the average time interval value. If the average time interval in step 122 is determined to be greater than 30 minutes then the process continues to step 126 where a search rate is set proportional to 30 minutes.

In step 128 it is determined if the time interval, set in either step 124 or 126, has expired. If the time has expired, the process flows from connection X on sheet 2 of FIG. 6 to connection Y on sheet 1 of FIG. 6, and further to step 100 where a search for suitable network begins again. If, in step 128, time has not expired then the process continues to step 130 where it is determined whether a new time interval measurement has been made.

If, in step 130, a new time interval has recently been measured, the process continues to step 132 where the oldest time interval measurement in storage is discarded. The process continues to step 134 where the newest time interval measurement is added into storage. The process continues to step 136 where a weighted time interval average is calculated as in step 118. One preferred embodiment of the invention includes the steps of measuring the time intervals between the selection of cells by the mobile station, storing the time intervals measured, and organizing the time interval measurements stored with respect to the elapse of time since each measurement was made.

Another preferred embodiment of the present invention, includes the step of replacing an initial value in storage with a measured time interval every time a time interval is measured, so that after n time interval measurements, no initial values remain stored, and the n measured time intervals are organized so that the time interval measurements are stored with respect to the elapse of time since each measurement was made. The method also includes the step of removing the oldest time interval measurement from storage and adding the most recent time interval measurement to storage every time a new measurement in made, whereby initial values are used to calculate the average time interval upon start-up of the mobile station, the initial values being replaced with actual time intervals as they are measured, and older measured time intervals being replaced sequentially with more recently measured time intervals so that the n most recent measured time intervals are used to calculate the average time interval.

From step 136 the process continues to step 138 which applies a scaling factor, as was done in step 120 above. The process continues to step 140 where it is determined whether the new average time interval, just calculated in steps 136 and 138, is greater than the old average time interval calculated in steps 118 and 120. If, in step 140, it is determined that the new value is greater than the old value, the process continues to step 142 where it is determined if the time elapsed since the last home network search is greater than the new average time interval. If the elapsed time is greater than the new average time interval, the process continues to step 144 where the rate interval time is stopped. At step 144 the process continues from connection M on sheet 2 of FIG. 6 to connection N on sheet 1 of FIG. 6, and further to step 100 where a new search for a suitable network is begun.

If, in step 142, it is determined that the elapsed time is greater than the new average time interval, the process continues to step 146 where the timer is restarted with a time value equal to the difference between the new average time interval and the time that has elapsed since the last home network search. The process continues to step 148 which determines whether the mobile station has lost the signals of all the cells in the network the mobile station has currently chosen. Likewise, if in step 140 it is determined that the new average time interval is greater than the old average time interval, the process continues to step 148. Further, in step 130, when no new time interval measurements have been made, the process continues to step 148. If, in step 148, the mobile station determines that it has lost contact with all the cells in the network, the process continues to step 144 to stop the rate interval time, and further to step 100 to begin a search for a new suitable network.

If, in step 148, there has been no loss of signal, the process continues to step 150 to determine if a call is to be established between the mobile station and a cell. If, in step 150, no call is to be established then the process goes to step 128 to wait for time to expire. If a call is to be established in step 150, the process continues to step 152 where the rate interval time is stopped. The process continues further to step 154 to determine if the mobile station is in a dedicated mode. In the dedicated mode the mobile station has been assigned a channel for user communications.

If, in step 154, the mobile station is in a dedicated mode, the process continues to a step 156 to determine if a handover is required. A handover is a network decision made to have the mobile station communicate with another cell, other than the one that it is currently communicating through. If a handover is required, the process continues to step 158 which performs the handover. The handover process causes a new time interval measurement to be made since the mobile station changes the cell it communicates through. The process continues to step 160 where the oldest time interval measurement in storage is discarded as in step 132. The process farther continues to step 162 where the new time interval is put in storage as in step 134.

The process continues to step 154, again, to determine if the mobile station is still in the dedicated mode. If, in step 154, it is determined that the mobile station is no longer in the dedicated mode, the process continues to step 118 where a weighted average time interval is again calculated. If, in step 156, no handover is required, the process continues to loop between steps 156 and 154 until the mobile station is no longer in the dedicated mode and finally proceeds to step 118 to calculate a new weighted average.

Table 1 is a software program written in the C language to implement a weighted average calculation. Table 1A illustrates the process of inserting new time interval measurements into storage and discarding the oldest time interval measurements. The top half of the table is a description of the software process, while the bottom half of the table is the actual code. Referring to FIG. 3, the code provides instructions for shifting the contents of the (n–1)th register into nth register 54, and to likewise sequentially shift contents of the (n–2)th register into the (n–1) register, and so on, until the contents of the first storage register 42 are shifted to second storage register 46. Finally, the most recent time interval measurement on line 20 is stored into first register 42.

Table 1B illustrates the process of calculating the weighted average from the time interval measurements held in storage. The contents of nth storage register 54 are multiplied by a function that varies according to which register's contents it is multiplying. That is, the contents of each register are given different priorities or weightings. The contents of each storage register are sequentially multiplied by the weighting function and added to the average. After the contents of all n storage registers have been multiplied and added to the average they are divided by n to create the average time interval, and then divided by m to apply a scaling factor.

TABLE 1A

```
int StorageElement[N];
/*
****************************************************************
*
*   Function Name:   PutStorageElement
*
*   Description:     Inserts a new value into the shift register
*                    discarding the oldest value
*
*   Input(s):        The new value to be inserted
*
```

TABLE 1A-continued

```
*   Returns:     None
*
*   Algorithm:   Shifts by one position all the values to the right
*                one position (thus discarding the oldest value)
*                and copying the new value in the first position.
*
***************************************************************
*/
void PutStorageElement(int NewTimeInterval)
{
int position;
for (position = N - 1; position > 0; position--)
    {
    StorageElement[position] = StorageElement[position - 1];
    }
StorageElement[0] = New TimeInterval;
}
```

TABLE 1B

```
/*
***************************************************************
*
*   Function Name:  CalculateAverage
*
*   Description:    Calculates the weighted averages of the
*                   cell selection intervals
*
*   Input(s):       None
*
*   Returns:        The weighted average
*
*   Algorithm:      A weighted arithmetic mean is calculated with
*                   the weights being returned be another function
*                   which is defined elsewhere. A scaling factor is
*                   also applied and the resulting value is hard-
*                   limited to the maximum value.
*
***************************************************************
*/
int CalculateAverage(void)
{
int Average = 0;
int i;
for (i = 0; i < N; i++)
    {
    Average = Average + StorageElement[i] * f(i);
    }
Average = Average/N;    /* Calculate the average value */
Average = Average/M;    /* Apply scaling factor */
if(Average < MaxValue)
    {
    return Average;
    }
else
    {
    return MaxValue;
    }
}
```

Table 1C shows the instructions for creating a linear weighting function for use in the weighted averaging process depicted in Table 1B. The function f(n) varies for the value of n. K and C are constants, where K is multiplied by (−(n+1)). The function f(n) has the largest value when the value of n is the lowest. That is, the functional expression is larger for smaller values of n. Therefore, the contents of the registers with the most recent time interval measurements are multiplied by a larger number and are more important in the average time interval calculation.

TABLE 1C

```
/*
***************************************************************
*
*   Function Name:  f
*
*   Description:    The weighting function (linear)
*
*   Input(s):       None
*
*   Returns:        Weight for the nth storage element
*
*   Algorithm:      The weight for the nth storage element according
*                   to a linear (straight line) weighting function.
*
***************************************************************
*/
float f(int n)
{
return (-(n + 1) * K) + C;
}
```

Table 1D depicts the instructions for a non-linear average weighting function. The value of K is constant, and is divided by an exponential expression dependent on the value n. As in Table 3 the functional expression is larger for smaller values of n. This non-linear weighting function gives an even higher priority, to recent time interval measurements in the weighted average time calculation, than the linear function.

TABLE 1D

```
/*
***************************************************************
*
*   Function Name:  f
*
*   Description:    The weighting function (exponential)
*
*   Input(s):       None
*
*   Returns:        Weight for the nth storage element
*
*   Algorithm:      The weight for the nth storage element according
*                   to a exponential weighting function.
*
***************************************************************
*/
float f(int n)
{
return K * (1/exp(n) );
}
```

The present invention provides an improved technique for a mobile station to determine the rate at which it must search for its home network. A mobile station using the system and method of the present invention no longer need wait 30 minutes to initiate a home search. Yet, home searches are not initiated at such a rate as to unduly waste battery power. The mobile station gauges its movement, or speed, by the rate at which cells are reselected. The cell selection rate is used to determine the home search rate. The faster the cell selection rate, the faster the home search rate. The present invention can be easily implemented with a microprocessor controlled by a software program. The invention can also be implemented strictly with hardware.

Alternate embodiments of the above described system and method of the present invention can be applied to a variety of cellular telephones systems or wireless communication systems, including GSM, the Digital Cellular System at 1800 Mhz (DCS 1800), and Personal Communications Service at 1900 Mhz (PCS 1900). Other modifications and variations within the scope of the present invention will occur to those skilled in the art.

What is claimed is:

1. In a wireless communications system servicing a geographical area and including a plurality of communicating networks within the geographical area, each network including a plurality of intercommunicating cells, the communications system also including a plurality of mobile stations to send and receive user information, each mobile station identifying cells in a network to select one proximate cell for communications, with cells from a predetermined home network being preferably selected, a method for determining the rate at which a mobile station searches for a home network comprising the steps of:
   a) determining the rate at which cells are selected by the mobile station;
   b) searching for a home network at a home network search rate that is proportional to the cell selection rate determined in step a);
   c) calculating the average time interval between cell selections; and
   d) determining if the average time interval, calculated in step c), is less than a predetermined first value in order to generate a home network search rate as follows:
      i) when the average time interval is less than the first value, selecting a search rate proportional to the average time interval calculated in step c); and
      ii) when the average time interval is greater than the first value, selecting a search rate proportional to the first value.

2. The method for determining the rate at which a mobile station searches for a home network as in claim 1 further comprising the steps of:
   summing n measured time intervals to provide a time interval sum; and
   dividing the time interval sum by n to provide the average time interval of step c).

3. The method for determining the rate at which a mobile station searches for a home network as in claim 1 further comprising the step of (e) dividing the average time interval calculated in step c) by a predetermined second value to scale the average time interval before the determination is made, in step d), of the home network search rate.

4. The method for determining the rate at which a mobile station searches for a home network as in claim 3 further comprising the steps of:
   f) measuring the time intervals between the selection of cells by the mobile station;
   g) storing the time intervals measured in step f); and
   h) organizing the time interval measurements stored in step g) with respect to the elapse of time since each measurement was made.

5. The method for determining the rate at which a mobile station searches for a home network as in claim 4 further comprising the step of (i) calculating the average time interval in step c) by prioritizing the measured time intervals with respect to the organization of step h), to create a weighted average time interval with the most recently measured time interval having the greatest priority in the determination of the average.

6. The method for determining the rate at which a mobile station searches for a home network as in claim 4 including the steps of:
   j) storing the n most recently measured time intervals in step f) according to the organization of step h); and
   k) calculating the average time interval in step c) with the n measured time intervals stored in step j).

7. The method for determining the rate at which a mobile station searches for a home network as in claim 6 wherein the mobile station has a start-up condition when power is first applied to the mobile station, and wherein the mobile radio has a permanent memory containing at least n initial values accessible to the mobile station during start-up, and further comprising the steps of:
   l) storing n initial values upon start-up to provide initial cell selection time intervals;
   m) replacing an initial value in storage with a measured time interval every time a time interval is measured in step f), so that after n time interval measurements, no initial values remain stored, and the n measured time intervals are organized as in step h); and
   n) removing the oldest time interval measurement from storage and adding the most recent time interval measurement to storage every time a new measurement in made in step f), whereby initial values are used to calculate the average time interval upon start-up of the mobile station, the initial values being replaced with actual time intervals as they are measured, and older measured time intervals being replaced sequentially with more recently measured time intervals so that the n most recent measured time intervals are used to calculate the average time interval.

8. In a wireless communications system servicing a geographical area and including a plurality of communicating networks within the geographical area, each network including a plurality of intercommunicating cells, the communications system also including a plurality of mobile stations to send and receive user information, each mobile station identifying cells in a network to select one proximate cell for communications, with cells from a predetermined home network being preferably selected, a method for determining the rate at which a mobile station searches for a home network comprising the steps of:
   determining the rate at which cells are selected by the mobile station;
   searching for a home network at a home network search rate that is proportional to the cell selection rate; and
   assigning the most recent time interval measurement between cell selections with the highest priority in generating the home network search rate.

9. In a wireless communications system servicing a geographical area and including a plurality of communicating networks within the geographical area, each network including a plurality of intercommunicating cells, the communications system also including a plurality of mobile stations to send and receive user information, each mobile station identifying cells in a network to select one proximate cell for communications, with cells from a predetermined home network being preferably selected, a system for determining the rate at which a mobile station searches for a home network comprising:
   a Home Public Land Mobile Network (HPLMN) search rate generator to sense the rate at which the mobile station selects cells, and to generate a home network search rate proportional to the cell selection rate;
   a storage register for storing the measurement of the time intervals between cell selections by the mobile station, said register having an input to accept the most recent time interval measurement, and an output to provide stored time interval measurements; and
   a comparator circuit to compare a time interval measurement with a predetermined first value, said comparator having a first input operatively connected to the output of said storage register to accept the time interval measurement, a second input to accept the predetermined first value, and an output to provide the home search rate as follows:
  i) when the time interval is less than the first value, providing a search rate proportional to the measured time interval; and
  ii) when the time interval is greater than the first value, providing a search rate proportional to the first value.

10. The system for determining the rate at which a mobile station searches for a home network as in claim 9 further comprising;
  a summing circuit for summing time interval measurements, said summing circuit having an input operatively connected to the output of said storage register to accept time interval measurements, and an output to provide a time interval sum;
  a first divider circuit for dividing the time interval sum by an averaging value, said first divider circuit having an input operatively connected to the output of said summing circuit to accept the time interval sum, and an output to provide an average time interval; and
  said comparator circuit first input operatively connected to the output of said first divider circuit to accept the average time interval for comparison to the first value.

11. The system for determining the rate at which a mobile station searches for a home network as in claim 10 wherein the averaging value is equal to n, and in which n measured time intervals are summed in said summing circuit, and said first divider divides the time interval sum by n to provide the average time interval.

12. The system for determining the rate at which a mobile station searches for a home network as in claim 10 further comprising a second divider circuit for dividing the average time interval by a predetermined second value, said second divider having an input operatively connected to the output of said first divider to accept the average time interval, and an output operatively connected the said comparator circuit first input to provide a scaled average time interval to said comparator for comparison to the first value, whereby the average time interval is modified before it is compared with the first predetermined value.

13. The system for determining the rate at which a mobile station searches for a home network as in claim 10 in which said storage register is a system of n sequential storage registers, a first storage register having an input to accept the most recent time interval measurement between cell selections, said first storage register having an output operatively connected to the input of an nth storage register to shift a stored time interval measurement, the output of said first storage register also operatively connected to the input of said summing circuit, said n storage registers sequentially connected to store the n most recent time interval measurements and providing the n most recent time interval measurements to the input of said summing circuit.

14. The system for determining the rate at which a mobile station searches for a home network as in claim 13 wherein the mobile station has a start-up condition when power is applied to the mobile station, and wherein the mobile station has a permanent memory device containing at least n initial values accessible to the mobile station during start-up, and in which an initial value is stored in each of said n storage registers upon start-up of the mobile station, one initial value being removed from said nth storage register every time a time interval measurement is received by said first storage register, with initial values being replaced by measured time intervals until no initial values remain stored in said storage registers, whereby initial values are used in the calculation of the average time interval until actual time intervals are measured.

15. The system for determining the rate at which a mobile station searches for a home network as in claim 13 further comprising n amplifiers with n predetermined gains, a first amplifier having an input operatively connected to the output of said first storage register, and an output operatively connected to the input of said summing circuit to amplify the time interval measurement, each one of said n amplifier inputs operatively connected between one of said n storage register outputs and said summing circuit input to create n storage register-amplifier pairs, whereby the most recent time interval measurements can be emphasized to create a weighted average time interval.

16. The system for determining the rate at which a mobile station searches for a home network as in claim 13 wherein the averaging value is equal to n, and in which n measured time intervals are summed by said summing circuit, and said first divider circuit divides the time interval sum by n to provide the average time interval.

17. The system for determining the rate at which a mobile station searches for a home network as in claim 16 further comprising a second divider circuit for dividing the average time interval by a predetermined second value, said second divider having an input operatively connected to the output of said first divider to accept the average time interval, and an output operatively connected the said comparator circuit first input to provide a scaled average time interval for comparison to the first value, whereby the average time interval is modified before it is compared with the first predetermined value.

18. In a wireless communications system servicing a geographical area and including a plurality of communicating networks within the geographical area, each network including a plurality of intercommunicating cells, the communications system also including a plurality of mobile stations to send and receive user information, each mobile station identifying cells in a network to select one proximate cell for communications, with cells from a predetermined home network being preferably selected, a system for determining the rate at which a mobile station searches for a home network comprising:
  a Home Public Land Mobile Network (HPLMN) search rate generator to sense the rate at which the mobile station selects cells, and to generate a home network search rate proportional to the cell selection rate, in which the most recent time interval measurement between cell selections, sensed by said HPLMN search rate generator, is assigned the highest priority in generating the home network search rate.

* * * * *